US007012799B2

(12) United States Patent
Muffoletto et al.

(10) Patent No.: US 7,012,799 B2
(45) Date of Patent: Mar. 14, 2006

(54) FLAT BACK CASE FOR AN ELECTROLYTIC CAPACITOR

(75) Inventors: Barry Muffoletto, Alden, NY (US); Edward J. Gloss, Clarence Center, NY (US); Douglas Eberhard, Grand Island, NY (US); Joseph Spaulding, Williamsville, NY (US); Yanming Liu, Clarence Center, NY (US); Neal Nesselbeck, Lockport, NY (US); Louis Marinaccio, Kenmore, NY (US); Eric Stemen, Roseville, MN (US); Rodney Stringham, Corfu, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 11/109,441

(22) Filed: Apr. 19, 2005
(Under 37 CFR 1.47)

(65) Prior Publication Data
US 2005/0243501 A1    Nov. 3, 2005

Related U.S. Application Data

(60) Provisional application No. 60/563,328, filed on Apr. 19, 2004, provisional application No. 60/563,329, filed on Apr. 19, 2004.

(51) Int. Cl.
*H01G 2/10* (2006.01)
(52) U.S. Cl. ............ 361/517; 361/301.3; 361/535; 29/25.03; 607/5
(58) Field of Classification Search .......... 361/301.3, 361/301.4, 308.1, 307, 310, 321.2, 321.3, 361/517–520, 534–538, 511–512; 607/5, 607/36; 29/25.03
See application file for complete search history.

(56) References Cited

U.S. PATENT DOCUMENTS

| | | | |
|---|---|---|---|
| 3,697,823 A | 10/1972 | Correll | |
| 5,250,373 A | 10/1993 | Muffoletto et al. | |
| 5,456,698 A | 10/1995 | Byland et al. | |
| 5,894,403 A | 4/1999 | Shah et al. | |
| 5,908,151 A | 6/1999 | Elias | |
| 5,920,455 A | 7/1999 | Shah et al. | |
| 5,926,362 A * | 7/1999 | Muffoletto et al. | 361/503 |
| 5,983,472 A | 11/1999 | Fayram et al. | |
| 6,006,133 A | 12/1999 | Lessar et al. | |
| 6,224,985 B1 | 5/2001 | Shah et al. | |
| 6,242,130 B1 | 6/2001 | Noh et al. | |
| 6,254,648 B1 | 7/2001 | Noh et al. | |
| 6,387,566 B1 | 5/2002 | Chang et al. | |
| 6,459,566 B1 * | 10/2002 | Casby et al. | 361/517 |
| 6,468,605 B1 | 10/2002 | Shah et al. | |
| 6,498,951 B1 * | 12/2002 | Larson et al. | 607/36 |

(Continued)

FOREIGN PATENT DOCUMENTS

EP    0 877 400 A1    11/1998

*Primary Examiner*—Anthony Dinkins
(74) *Attorney, Agent, or Firm*—Michael F. Scalise (57) ABSTRACT

An enclosure for an electrical energy storage device such as a wet tantalum electrolytic capacitor or an electrochemical cell such as a lithium/silver vanadium oxide cell is described. The enclosure comprises two metallic casing components or portions. The first is a drawn member having a planar face wall supporting a surrounding sidewall and is shaped to nest the anode, cathode and intermediate separator components. The surrounding sidewall has an annular flange at its outer periphery. A mating cover is a stamped planar piece of similar material whose periphery fits inside the annular flange or rim as a complementary piece.

16 Claims, 11 Drawing Sheets

U.S. PATENT DOCUMENTS

| | | |
|---|---|---|
| 6,505,073 B1 | 1/2003 | Gramse |
| 6,801,424 B1 * | 10/2004 | Nielsen et al. ............... 361/517 |
| 6,850,405 B1 * | 2/2005 | Mileham et al. ............ 361/302 |
| 6,859,353 B1 * | 2/2005 | Elliott et al. ................ 361/517 |
| 6,881,516 B1 | 4/2005 | Aamodt et al. |
| 6,885,887 B1 * | 4/2005 | O'Phelan et al. ............... 607/5 |
| 2001/0049057 A1 | 12/2001 | Frustaci et al. |
| 2002/0132163 A1 * | 9/2002 | Paulot et al. ............... 429/180 |
| 2003/0090857 A1 | 5/2003 | Liu et al. |
| 2003/0120320 A1 | 6/2003 | Solom |
| 2003/0142464 A1 | 7/2003 | Liu et al. |
| 2003/0186118 A1 | 10/2003 | Uyama et al. |
| 2003/0199941 A1 | 10/2003 | Nielsen et al. |
| 2005/0041374 A1 | 2/2005 | Seitz et al. |
| 2005/0190530 A1 * | 9/2005 | Muffoletto et al. ......... 361/517 |

* cited by examiner

FLAT BACK CASE FOR AN ELECTROLYTIC CAPACITOR

CROSS-REFERENCE TO RELATED APPLICATIONS

The present application claims priority based upon U.S. provisional application Ser. Nos. 60/563,328 and 60/563,329, both filed Apr. 19, 2004.

BACKGROUND OF THE INVENTION

The present invention generally relates to a capacitor and, more particularly, to a capacitor capable of powering an implantable medical device, such as a cardiac defibrillator.

SUMMARY OF THE INVENTION

A casing for an electrolytic capacitor, such as a wet tantalum capacitor comprises two complementary metallic components or portions. The first has a planar face wall supporting a surrounding sidewall and is shaped to nest the anode, cathode and intermediate separator components. The surrounding sidewall has an annular flange at its outer periphery. A mating cover comprises a planar piece of similar material whose periphery fits inside the annular flange or rim as a complementary piece. In a second embodiment, the mating planar cover is provided with an indentation that coincides with the surrounding sidewall. This indentation either follows the entire periphery of the surrounding sidewall or only a portion thereof. Laser welding along the edge of the flange of the first component and the mating planar cover achieves a hermetic seal.

In any event, the thusly-constructed capacitor has a planar shape at the cover. This benefits cost of construction, especially when a drawn process forms the casing portions. In conventional casings having mating "clamshells", each portion comprises a major face wall supporting a surrounding sidewall. This means that two casing pieces must be drawn, which adds manufacturing costs. In some embodiments of the present casing only one of the mating casing portions is of a drawn construction. The cover is simply a stamped plate, which is easier and less costly to manufacture. Even in those embodiments where the cover plate is provided with a contoured profile, such as having the coinciding indentation, the drawn process is not nearly as costly as in the manufacture of a clamshell shaped portion. Additionally, the planar cover enables the capacitor to be easily positioned in a confined space, such as exists in an implantable medical device.

These and other aspects of the present invention will become more apparent to those skilled in the art by reference to the following description and to the appended drawings.

DETAILED DESCRIPTION OF THE PREFERRED EMBODIMENTS

Figure 1:
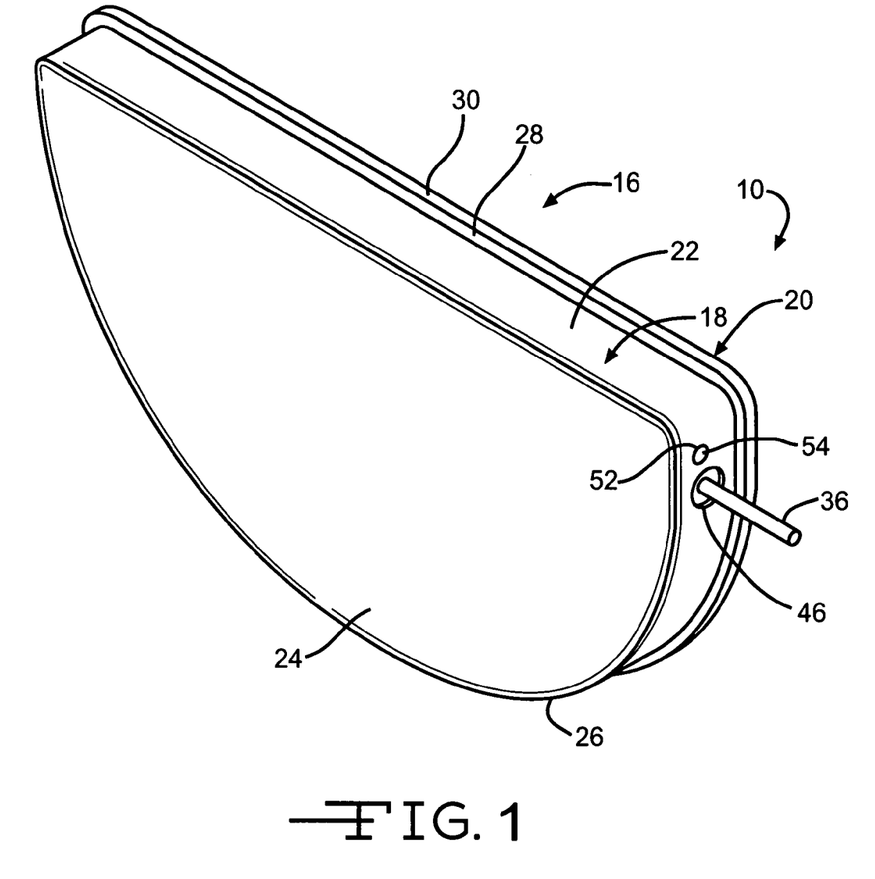
FIG. 1 is a perspective view of a capacitor 10 according to the present invention.

Referring now to the drawings, FIG. 1 is a perspective view showing a capacitor 10 according to the present invention. The capacitor 10 comprises an anode 12 (FIGS. 2 and 3) of an anode active material and a cathode of a cathode active material 14 housed inside a hermetically sealed enclosure 16. The capacitor electrodes are operatively associated with each other by a working electrolyte (not shown) contained inside the enclosure, as will be described in detail hereinafter. The capacitor 10 is of an electrolytic type with the cathode comprising a conductive material having capacitive properties.

Figure 2:
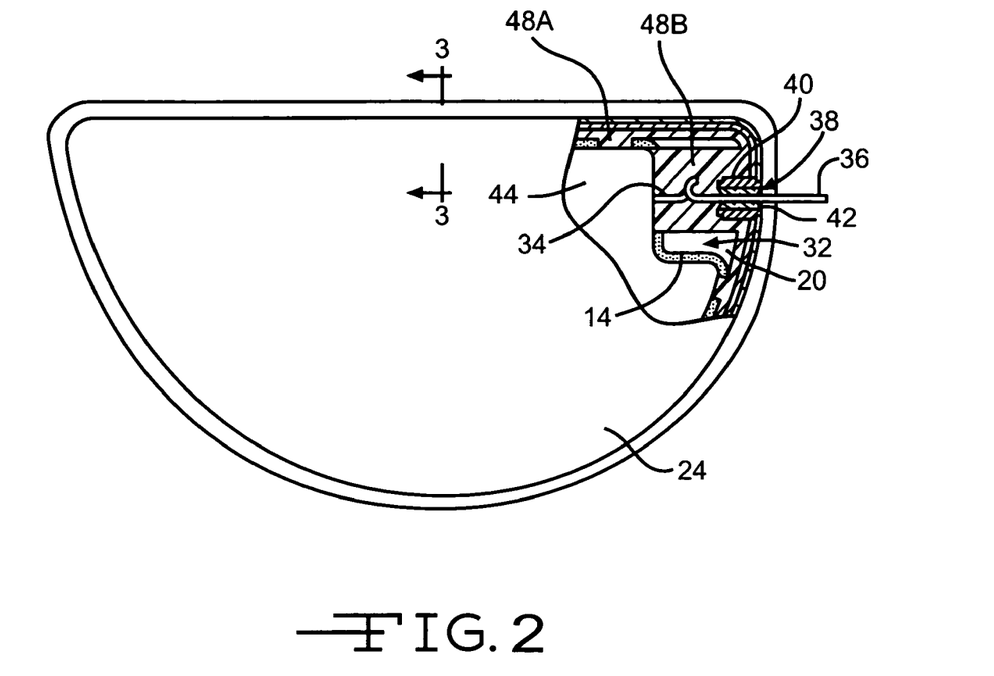
FIG. 2 is a side elevational view, partly broken away, of the capacitor 10 in FIG. 1.
Figure 3:
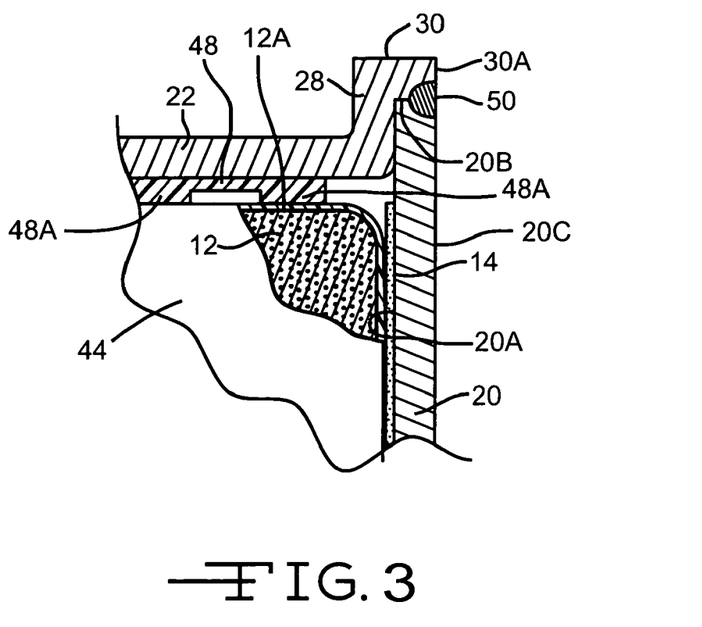
FIG. 3 is a cross-sectional view taken along line 3—3 of FIG. 2.

The enclosure 16 is of a metal material comprising first and second casing portions 18 and 20. Casing portion 18 is preferably of a drawn construction and comprises a surrounding sidewall 22 extending to and meeting with a face wall 24 at a curved intermediate bend 26. Opposite the bend 26, sidewall 22 forms into an upstanding surrounding web 28 extending to a rim 30. The web 28 and extending rim 30 are continuous about the perimeter of the sidewall 22. That way, they form a recess precisely sized to receive the planar, plate shaped casing cover 20 when it is nested therein, as will be explained in detail later. Being a plate, casing cover 20 is preferably stamped from a sheet of metal stock.

The casing portions 18, 20 are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. In addition to being of a drawn form, casing portion 18 can be of a machined construction or be formed by a metal injection molding process. Preferably, the casing portions have a thickness of about 0.001 to about 0.015 inches.

The active material of the anode 12 is typically of a metal selected from the group consisting of tantalum, aluminum, titanium, niobium, zirconium, hafnium, tungsten, molybdenum, vanadium, silicon, germanium, and mixtures thereof. As is well known by those skilled in the art, the anode metal in powdered form, for example tantalum powder, is compressed into a pellet having a notch 32 from which an embedded anode wire 34 extends. The anode wire 34 preferably comprises the same material as the anode active material. The anode pellet is sintered under a vacuum at high temperatures and then anodized in a suitable electrolyte. The anodizing electrolyte fills the pores of the pressed powder body and a continuous dielectric oxide is formed thereon. In that manner, the anode 12 and extending wire 34 are provided with a dielectric oxide layer formed to a desired working voltage. The anode can also be of an etched aluminum, niobium, or titanium foil.

After the anode 12 and extending wire 34 are anodized to the desired formation voltage, the dielectric oxide is removed from the wire. The wire 34 is subsequently connected to an anode lead 36 supported in an insulative glass-to-metal seal 38 (GTMS). The glass-to-metal seal 38 comprises a ferrule 40 defining an internal cylindrical through bore or passage of constant inside diameter. An insulative glass 42 provides a hermetic seal between the ferrule bore and the anode lead 36 passing there through. The glass 42 is, for example, ELAN® type 88 or MANSOL™ type 88. The anode lead 36 has a J-shaped proximal portion that is connected to a crook (not shown) in the anode wire 34, which previously had the formed dielectric oxide removed. Laser welding secures the wire 34 and lead 36 together. The wire 34 and connected lead 36 are then re-anodized. Alternately, the anode wire 34 is a relatively straight member in line with and welded to a relatively straight anode lead 36.

A separator 44 of electrically insulative material in the shape of a bag completely surrounds and envelops the anode 12 except the extending wire 34. The separator 44 prevents an internal electrical short circuit between the anode 12 and cathode active materials 14 in the assembled capacitor and has a degree of porosity sufficient to allow flow there through of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polytetrafluoroethylene, and polyethylenechlorotrifluoroethylene laminated or superposed with a polyolefinic or fluoropolymeric microporous film, non-woven glass, glass fiber materials and ceramic materials. Additional separator materials may include films of poly sulfone and polyester, for example, polyethylene terephthalate. Suitable microporous films include a polyethylene membrane commercially available under the designation SOLUPOR® (DMS Solutech), a polytetrafluoroethylene membrane commercially available under the designation ZITEX® (Chemplast Inc.) or EXCELLERATOR® (W. L. Gore and Associates), a polypropylene membrane commercially available under the designation CELGARD® (Celanese Plastic Company, Inc.), and a membrane commercially available under the designation DEXIGLAS® (C. H. Dexter, Div., Dexter Corp.). Cellulose based separators also typically used in capacitors are contemplated by the scope of the present invention. Depending on the electrolyte used, the separator 44 can be treated to improve its wettability, as is well known by those skilled in the art.

The cathode active material 14 preferably coats the face wall 24 and the inner surface 20A of the casing cover 20 in a pattern that generally mirrors the shape of the anode 12. The cathode active material 14 has a thickness of about a few hundred Angstroms to about 0.1 millimeters and is either directly coated on the inner surface 20A of the casing cover 20 or it is coated on a conductive substrate (not shown) supported on and in electrical contact with the inner surface thereof. The other casing portion 18 has the cathode active material 14 similarly coated on its face wall 24 or on a conductive substrate secured to the inner surface of the face wall in electrical contact therewith. Both cathode material coatings are preferably spaced from the sidewall 22 of casing portion 18.

In that respect, the casing cover 20 and face wall 24 may be of an anodized-etched conductive material, have a sintered active material with or without oxide contacted thereto, be contacted with a double layer capacitive material, for example a finely divided carbonaceous material such as graphite or carbon or platinum black, a redox, pseudocapacitive or an under potential material, or be an electroactive conducting polymer such as polyaniline, polypyrole, polythiophene, polyacetylene, and mixtures thereof.

According to one preferred aspect of the present invention, the redox or cathode active material 14 includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 14 may also include a second or more metals. The second metal is in the form of an oxide, a nitride, a carbon nitride or carbide, and is not essential to the intended use of the conductive walls 20, 24 as a capacitor cathode. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material 14 includes an oxide of ruthenium or oxides of ruthenium and tantalum.

A pad printing process as described in U.S. Patent Application Pub. No. 2005/0041374 is preferred for making such a coating. An ultrasonically generated aerosol as described in U.S. Pat. Nos. 5,894,403; 5,920,455; 6,224,985; and 6,468,605, all to Shah et al., is also a suitable deposition method. These are assigned to the assignee of the present invention and incorporated herein by reference.

After the cathode active material is contacted to the face wall 24 of casing portion 18, the anode 12/separator 44 assembly is nested therein with a distal step of the GTMS 38 received in an opening 46 (FIG. 1) in the casing sidewall 22 in a tight fitting relationship. The ferrule 40 is then secured to the sidewall 22 such as by laser welding. In the final capacitor assembly the GTMS 38 electrically insulates the lead 36 connected to the anode wire 34 from the metal casing 18.

As shown in FIGS. 2 and 3, after the anode 12/separator 44 assembly is positioned in the casing portion 18, a polymeric cradle 48 is molded in a surrounding relationship about the separator enveloping the anode at the end wall 12A between the major anode face walls. It is the anode face walls that are directly opposite the cathode material 14 provided on the casing walls 20, 24. The polymeric cradle 48 comprises a web contacting the inner surface of the casing sidewall 22 and supporting a plurality of spaced apart protrusions 48A contacting the separator 44 at the perimeter of the anode end wall 12A. A rather large protrusion 48B encases the GTMS 38 including the anode wire 34 connected to the lead 36. For a detailed description of how the polymeric cradle 48 is manufactured around the separator 44 enveloping the anode 12, reference is made to U.S. application Ser. No. 11/069,272, filed Mar. 1, 2005, which is assigned to the assignee of the present invention and incorporated herein by reference.

With the anode 12 nested in the casing portion 18 held in position by the polymeric cradle 48, a major face wall of the anode 12 rests on the casing sidewall 24. However, the intermediate separator 44 prevents direct contact between the anode 12 and the cathode active material 14 provided on the sidewall 24. The casing cover 20 is then mated to the casing portion 18 with its inner surface 20A resting against the web 28 of sidewall 22 and its end wall 20B contacting the rim 30. In this position, the cathode active material 14 on the inner surface 20A of the casing cover 20 contacts the separator 44 immediately adjacent to the opposite major face wall of the anode 12.

A weld 50 is provided about the entire perimeter of casing cover 20 where its end wall 20B contacts the rim 30. This hermetically secures the casing portions 18, 20 together. The weld 50 is provided by any conventional means; however, a preferred method is by laser welding. During welding, the web 28 prevents the laser light from penetrating into the interior of the capacitor to damage the anode 12, cathode 14 and intermediate separator 44, among other heat sensitive components. Also, the web 28 and rim 30 are of sufficient mass to prevent heat generated during welding from damaging the internal components of the capacitor 10.

The outer surface 20C of the casing cover 20 is coplanar with the end 30A of rim 30 to provide the casing having a flat back profile. In addition to the manufacturing benefits of only having to draw casing portion 18 as cover is a stamped member, this facilitates housing the capacitor 10 in a confined space, such as inside an implantable medical device, for example, a cardiac defibrillator.

A working electrolyte (not shown) is then provided in the capacitor through an opening 52 in the sidewall 22 of casing portion 18. The spaces formed between the protrusions 48A and 48B of the polymeric cradle 48 provide for the electrolyte to thoroughly wet the anode 12 including the enveloping separator 44 and the cathode active materials 14 to provide the capacitor 10 in a functional state.

A suitable working electrolyte for the capacitor 10 is described in U.S. Pat. No. 6,219,222 to Shah et al., which includes a mixed solvent of water and ethylene glycol having an ammonium salt dissolved therein. U.S. Pub. No. 2003/0090857 and U.S. Pat. No. 6,687,117 to Liu et al. describe other working electrolytes for the present capacitors. The working electrolyte of the former publication comprises water, a water-soluble inorganic and/or organic acid and/or salt, and a water-soluble nitro-aromatic compound while the latter relates to an electrolyte having de-ionized water, an organic solvent, isobutyric acid and a concentrated ammonium salt. These are assigned to the assignee of the present invention and incorporated herein by reference. A closure member 54 hermetically welded therein then seals the electrolyte fill opening 52.

The enclosure 16, including the portions 18, 20, being of a conductive metal serves as the negative terminal for making electrical connection between the capacitor 10 and its load. A pin (not shown) is welded to one of the casing portions 18, 20 to provide this. The anode lead 36 extending outside the capacitor 10 is hermetically sealed from the interior of the capacitor and insulated from the enclosure 16 by the GTMS 38 to serve as the positive terminal for the capacitor 10.

Figure 4:
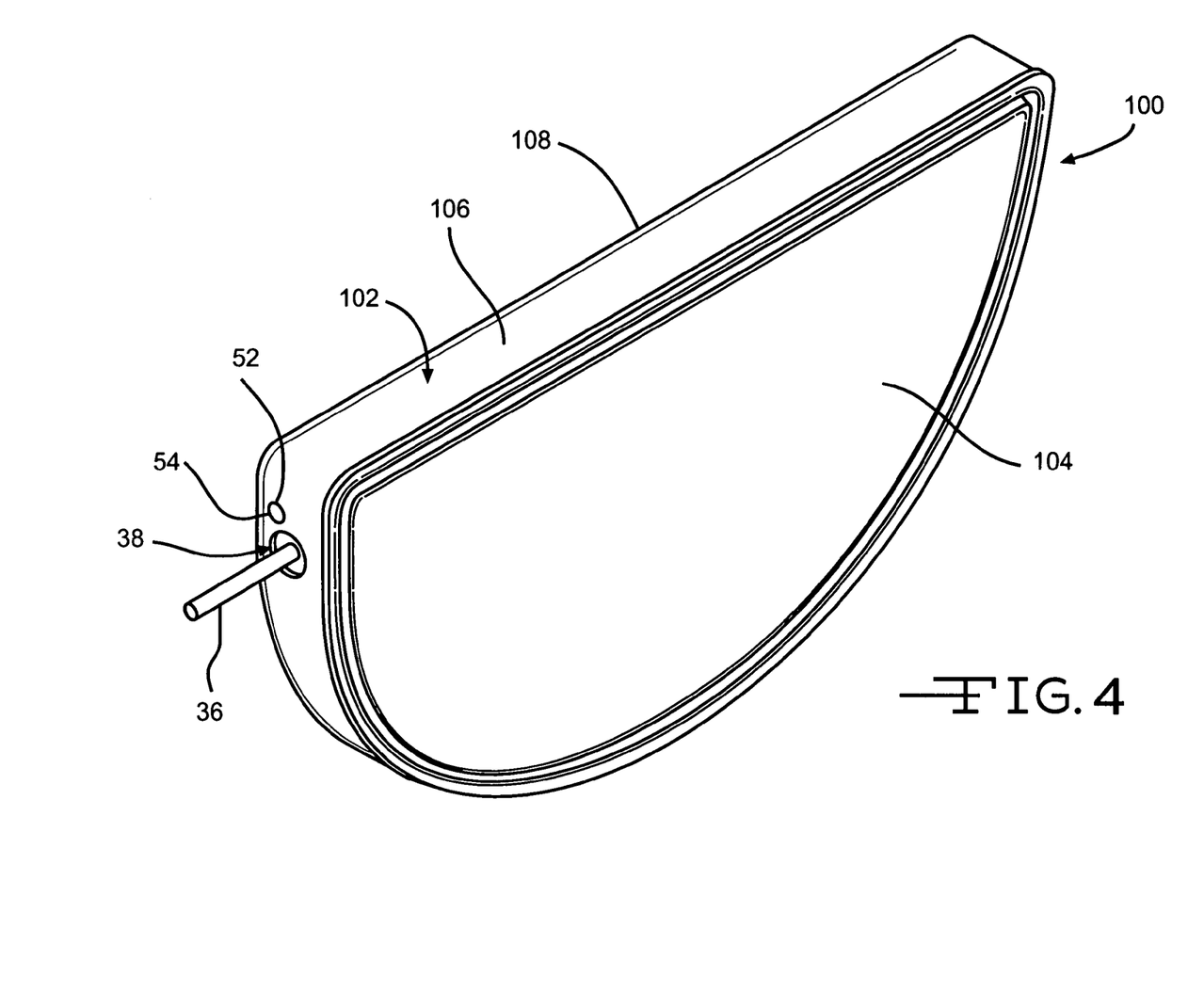
FIG. 4 is an isometric view of another embodiment of a capacitor 100 according to the present invention.
Figure 5:
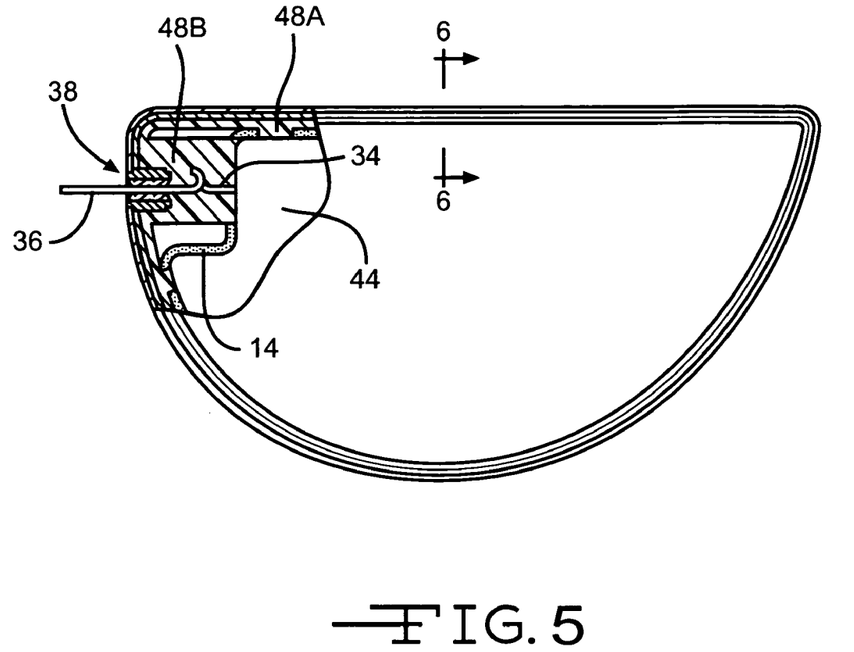
FIG. 5 is a side elevational view, partly broken away, of the capacitor 100 shown in FIG. 4.
Figure 6:
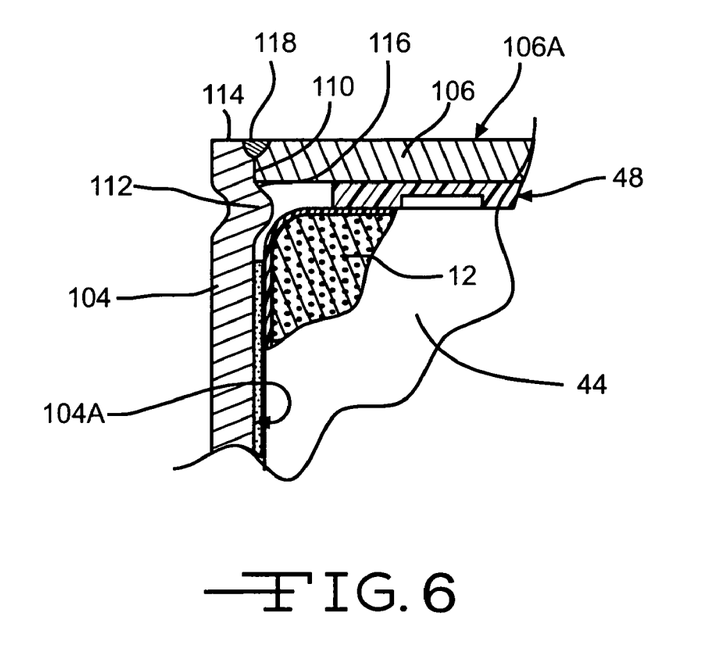
FIG. 6 is a cross-sectional view taken along line 6—6 of FIG. 5.

FIGS. 4 to 6 illustrate a further embodiment of a capacitor 100 according to the present invention. In this capacitor, the enclosure comprises first and second metal portions 102 and 104. Both are preferably of a drawn construction. Casing portion 102 has a surrounding sidewall 106 extending to and meeting with a back wall (not shown) at a curved intermediate bend 108. Opposite the bend 108, sidewall 106 forms an edge 110, oriented normal to the plane of the sidewall.

The casing cover 104 is of a generally planar, plate shape except for an inwardly curved protrusion 112 spaced from an edge 114 thereof. The protrusion 112 is provided about the entire perimeter of the cover, preferably by a drawn process.

As with the capacitor 10 described in FIGS. 1 to 3, the anode 12 enveloped by the separator 44 is nested in the casing portion 102 and held or retained in position by the polymeric cradle 48. One of the major anode face walls rests on the back casing sidewall. The casing cover 104 is then mated to the first casing portion 102 with the sidewall edge 110 contacting the annular protrusion 112. The distance between where the annular protrusion 112 begins on the inner surface of the cover, indicated by point 116, and the edge 114 is precisely sized to receive the thickness of the sidewall 106 of the first casing portion 102. With the casing cover 104 contacting the edge 110 of the sidewall 106, the outer sidewall surface 106A is co-planar with the plate edge 114. The cathode active material 14 on the inner surface 104A of the casing cover 104 contacts the separator 44 at the major anode face wall opposite the anode face wall resting on the back casing sidewall.

A weld 118 is then provided about the entire perimeter of the sidewall 106 opposite where its edge 110 rests against the annular protrusion 112 of the casing cover 104. During welding, the annular protrusion 112 prevents laser light from penetrating into the interior of the capacitor to damage the anode 12, cathode 14 and intermediate separator 44, among other heat sensitive components. The annular protrusion 112 also provides a sufficiently tortuous path to prevent heat generated during welding from damaging the internal capacitor components. The edge 114 of the casing cover 104 being coplanar with the outer surface 106A of the sidewall 106 provides the capacitor 100 with a flat back profile uniquely suited for positioning in a confined space, such as exists in an implantable medical device. In all other respects, capacitor 100 is similar to the previously described capacitor 10.

Figure 7:
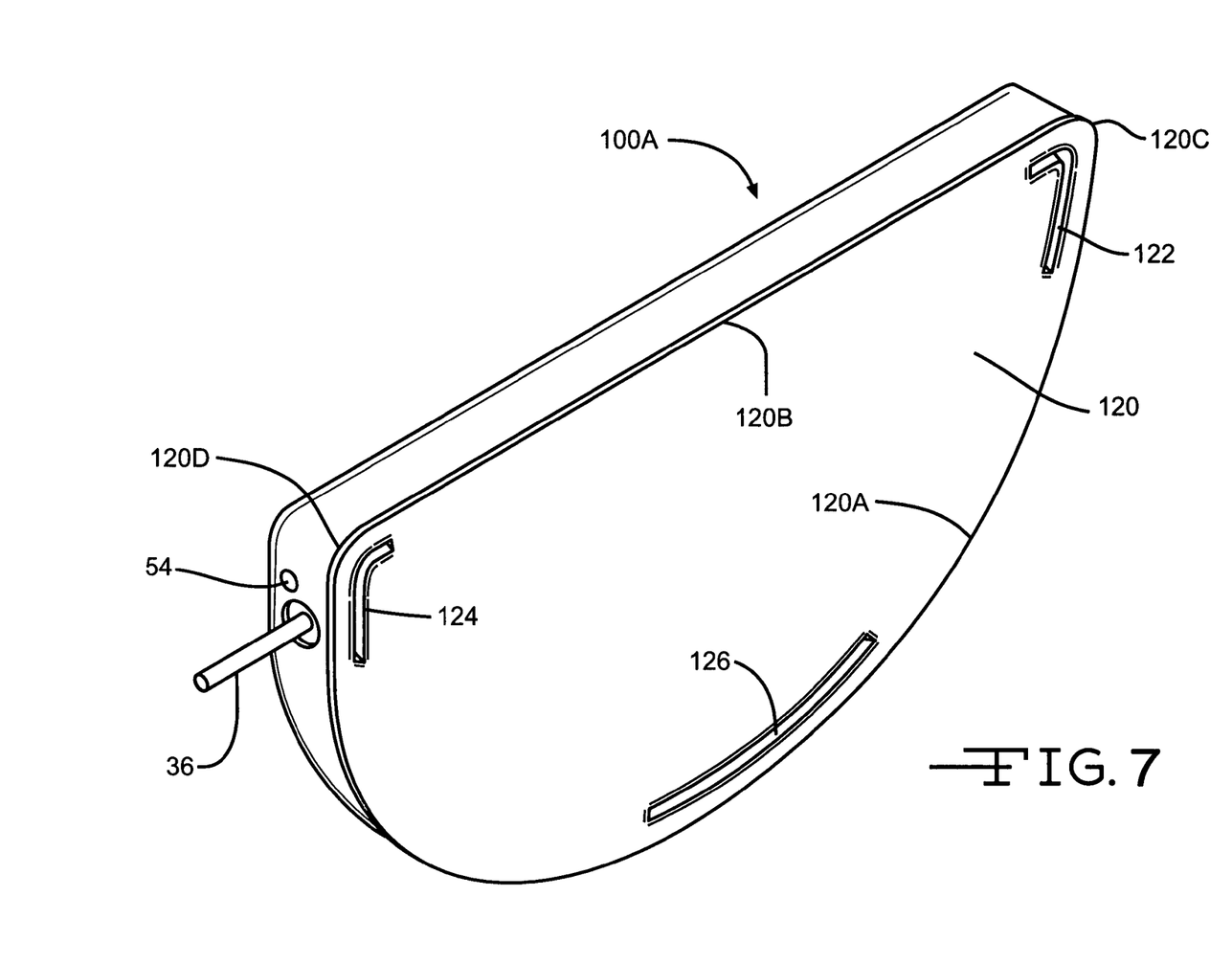
FIG. 7 is an isometric view of another embodiment of a capacitor 100A according to the present invention.

FIG. 7 illustrates an alternative construction for a capacitor 100A that is similar to capacitor 100. However, instead of an annular protrusion, the casing cover 120 has protrusions 122, 124 and 126 provided at spaced locations along the perimeter thereof. In particular, cover 120 comprises a generally U-shaped curved edge 120A meeting a straight edge 120B at right and left corners 120C and 120D. Protrusion 122 is adjacent to where straight edge 120B meets the curved edge 120A at the right corner 120C, protrusion 124 is adjacent to the left curved corner 120D and protrusion 126 is adjacent to the trough of the curved edge 120A, equally spaced between the right and left curved edges. All three protrusions 122, 124 and 126 are spaced from the edge of cover 120 a distance precisely sized to receive the thickness of the sidewall 106 of the first casing portion 102. The positioning and shape of the protrusions 122, 124 and 126 ensures this proper centering. However, since the protrusion structure is not continuous about the perimeter of the casing cover 120, the laser light used to weld the casing portions together must be incident at an angle so that penetration into the interior of the capacitor is prevented.

Figure 8:
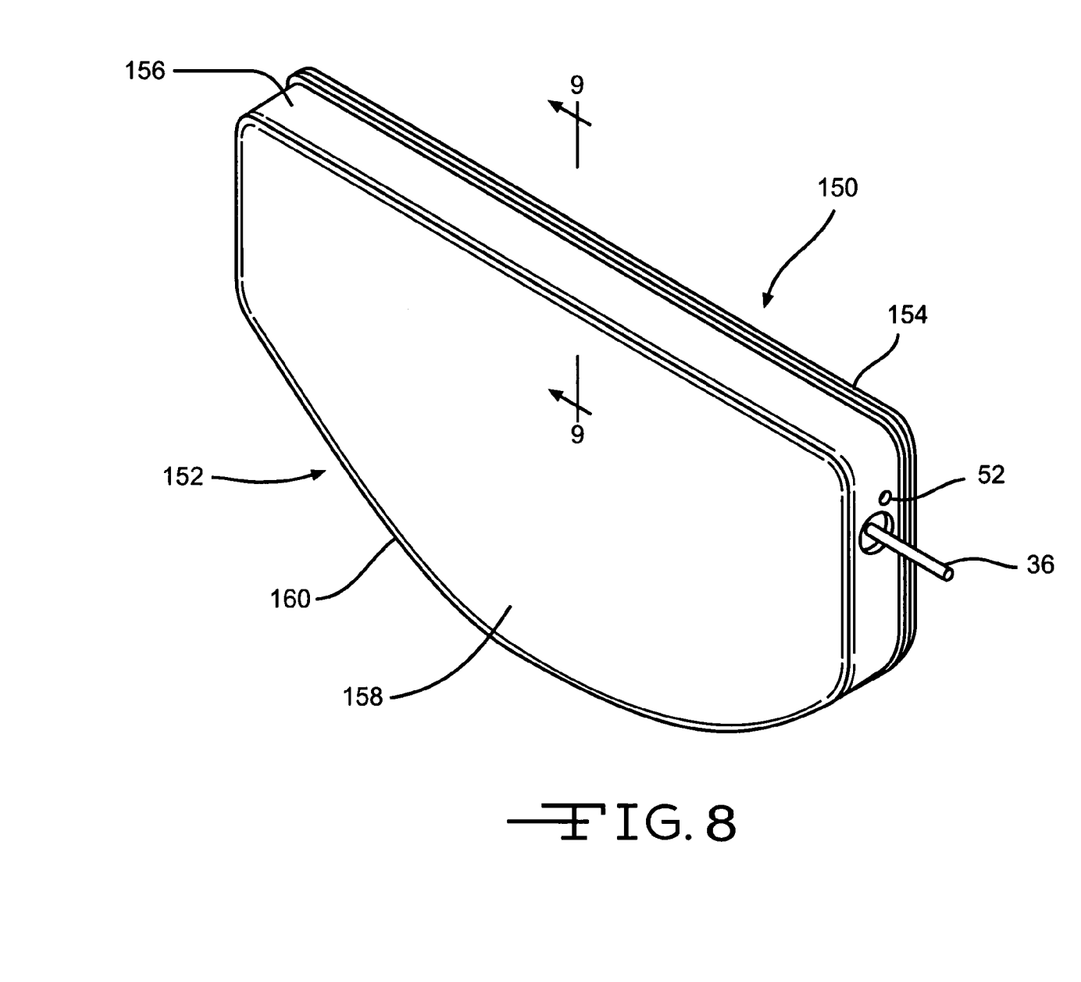
FIG. 8 is an isometric view of another embodiment of a capacitor 150 according to the present invention.
Figure 9:
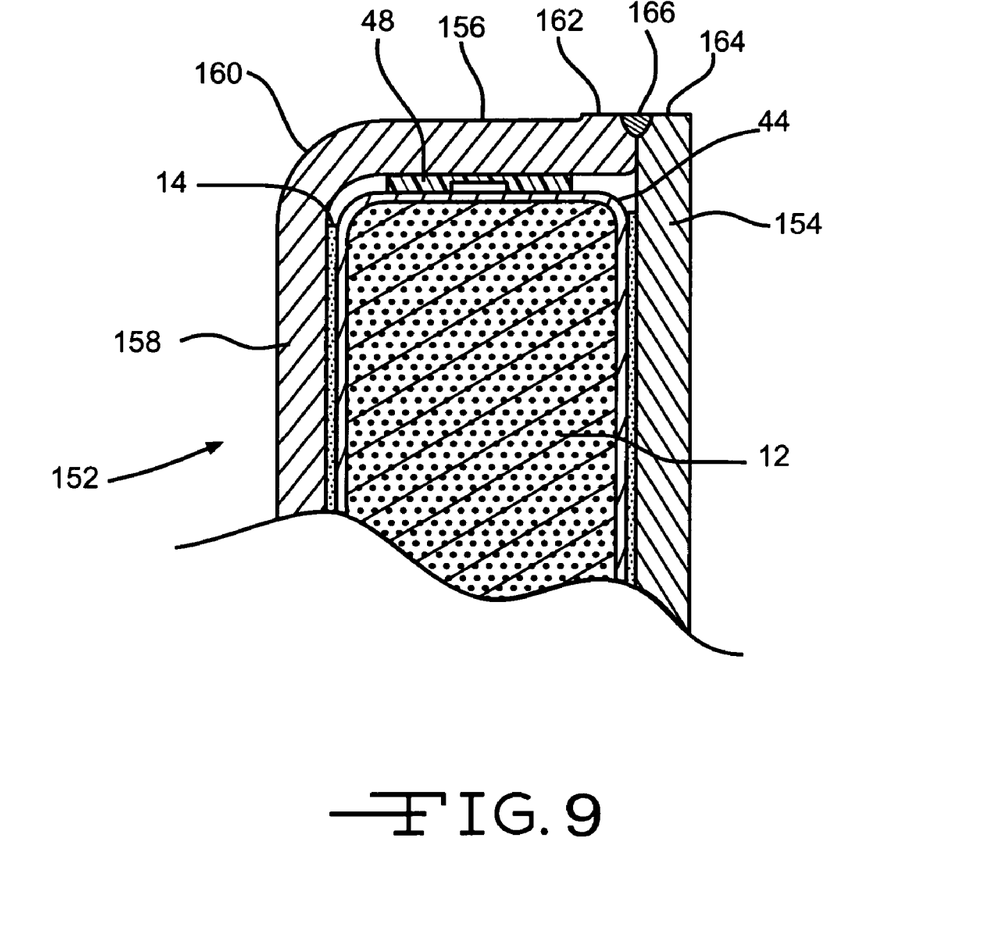
FIG. 9 is a cross-sectional view taken along line 9—9 of FIG. 8.

FIGS. 8 and 9 illustrate a further embodiment of a capacitor 150 according to the present invention. Capacitor 150 comprises first drawn casing portion 152 and a second stamped cover 154. Casing portion 152 has a surrounding sidewall 156 extending to and meeting with a face wall 158 at a curved intermediate bend 160. Opposite the bend 160, sidewall 156 forms into an annular extending edge 162. Casing portion 154 is a planar member sized so that its outer peripheral edge 164 is precisely aligned with the edge 162 of the first casing portion 152.

To construct the capacitor 150, the anode 12 enveloped by the separator 44 is nested in the casing portion 152, retained in position by the polymeric cradle 48. One of the major anode face walls rests on the cathode active material 14 contacted to the inner surface casing sidewall 158. The casing cover 154 having a cathode active material 14 contacted to its inner surface is then rested on the sidewall 156 with the edges 162, 164 of the respective casing portions 152, 154 in coplanar alignment. In this position, the cathode active material 14 on the inner surface 154A of cover 154 contacts the separator 44 at the other major anode face wall. This snug fitting relationship between the cathode active material 14 on cover 154 and on the sidewall 158 of casing portion 152 contacting the separator 44 at opposite sides of the anode in conjunction with the polymeric cradle 48 prevents the anode 12 from moving when the capacitor 150 is subjected to high shock and vibration forces.

A laser (not shown) then provides a weld 166 that hermetically seals the enclosure. However, the laser light must strike one of the web edges 162, 164 at an incident angle so that it does not penetrate past the seam between the casing portions to damage the internal capacitor components.

Figure 10:
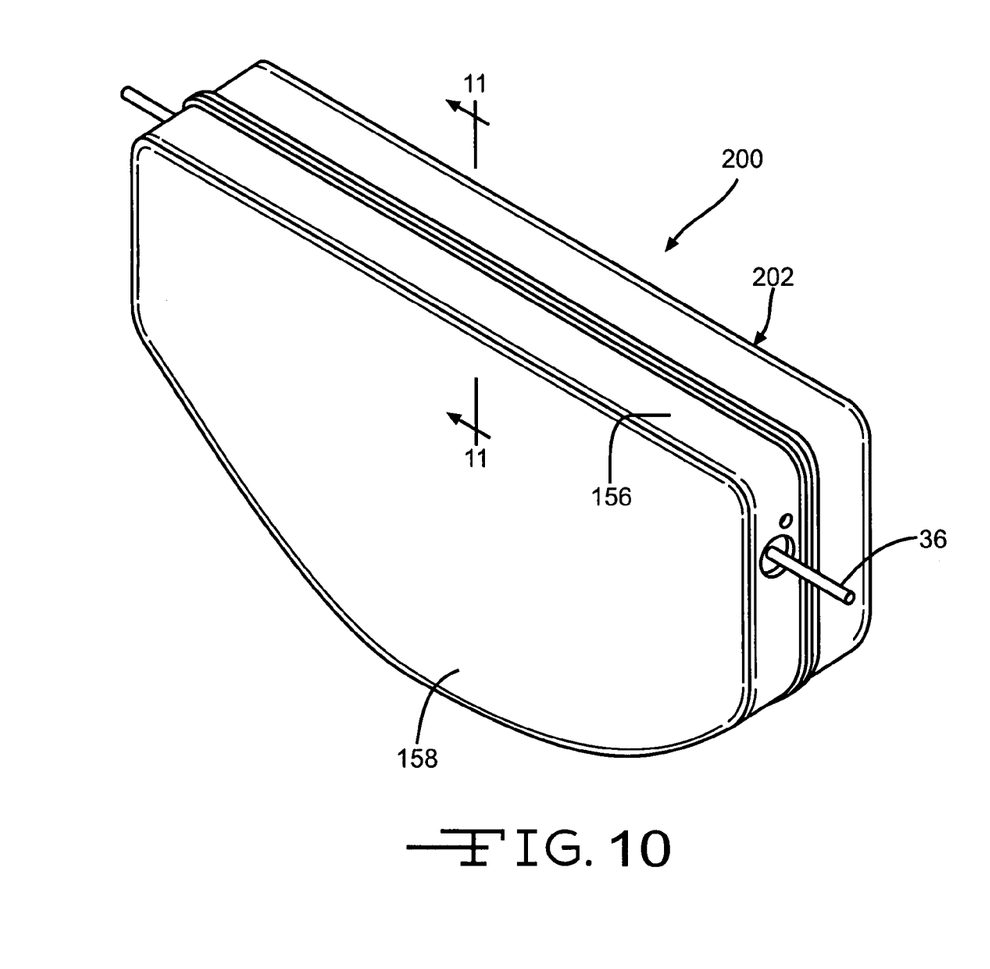
FIG. 10 is an isometric view of another embodiment of a capacitor 200 according to the present invention.
Figure 11:
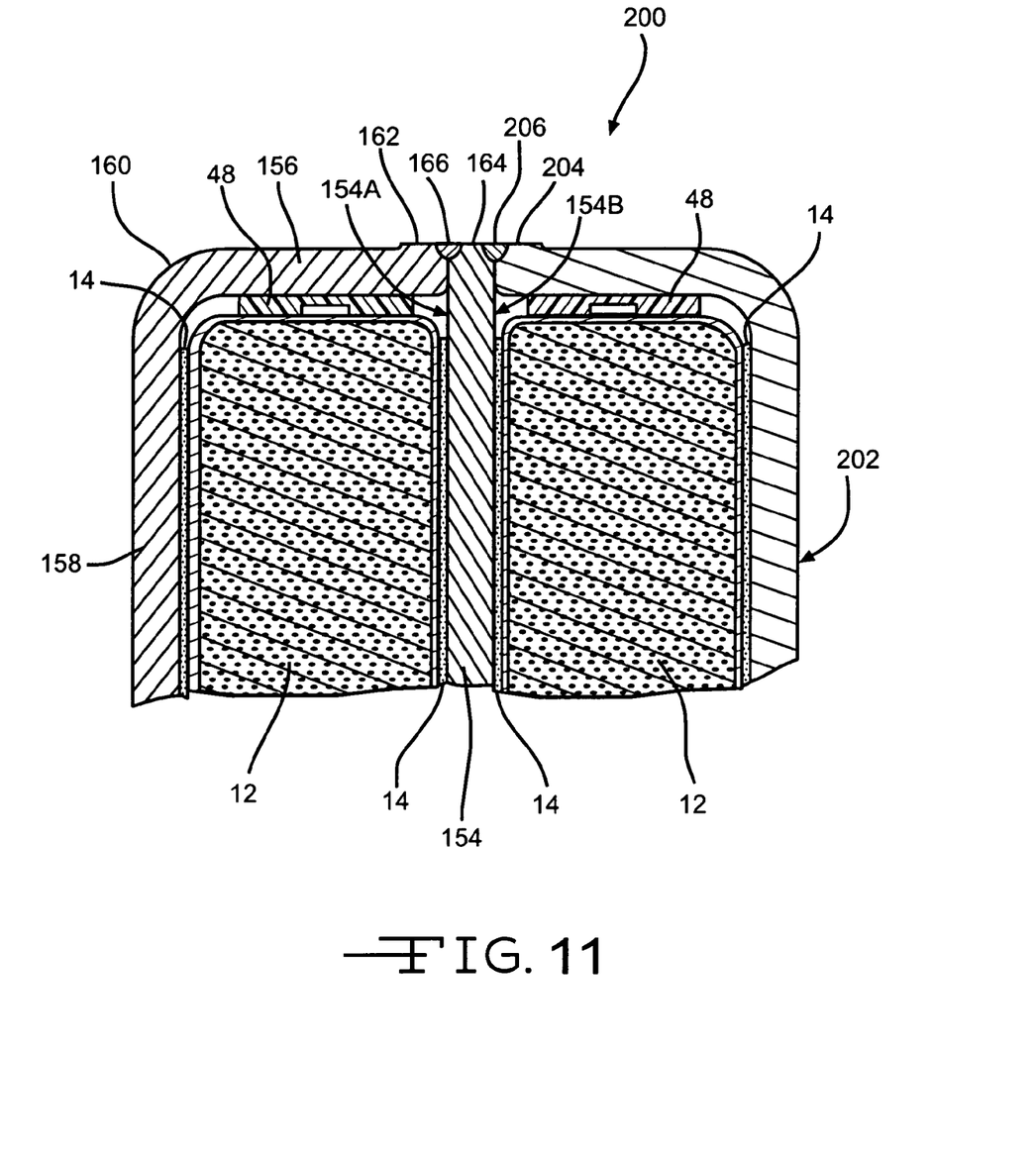
FIG. 11 is a cross-sectional view taken along line 11—11 of FIG. 10.

FIGS. 10 and 11 show a further embodiment of a capacitor 200 that includes as part of its structure the capacitor 150 illustrated in FIGS. 8 and 9. After completion of the capacitor 150, cathode active material 14 is deposited onto the opposite major surface 154B of the casing cover 154. If desired, this material can also be contacted to the cover 154 prior to it being used to close the first casing portion 152 of capacitor 150. Then, a second casing portion 202, which is a mirror image of the first casing portion 152, and having an anode 12 nested and retained therein is positioned against the opposite surface 154B of the casing cover 154. As before, the edges 162 and 202 of the respective casing portions 152, 202 as well as the edge 164 of the common cover 154 are in coplanar alignment before a laser is used to provide a peripheral weld 206, hermetically sealing the capacitor 200.

Figure 12:
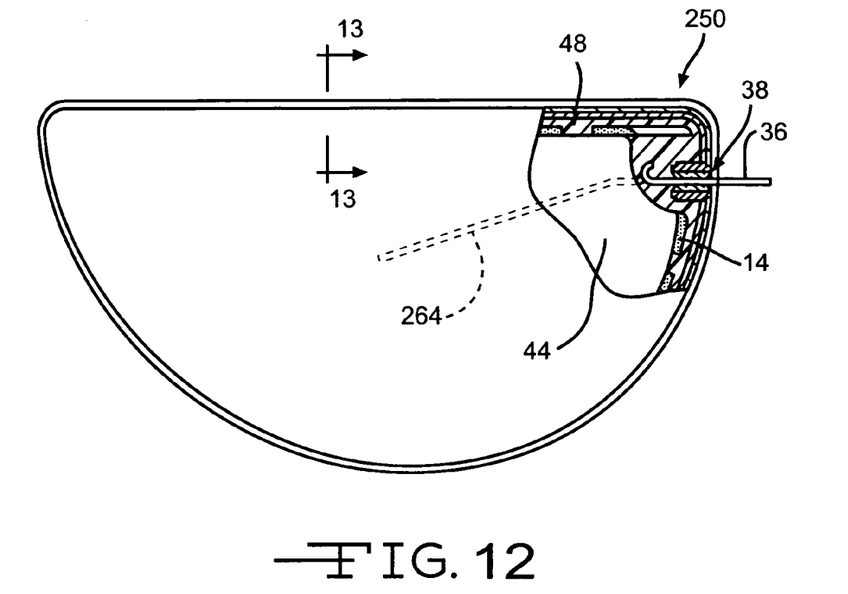
FIG. 12 is a side elevational view, partly broken away, of another embodiment of a capacitor 250 according to the present invention.
Figure 13:
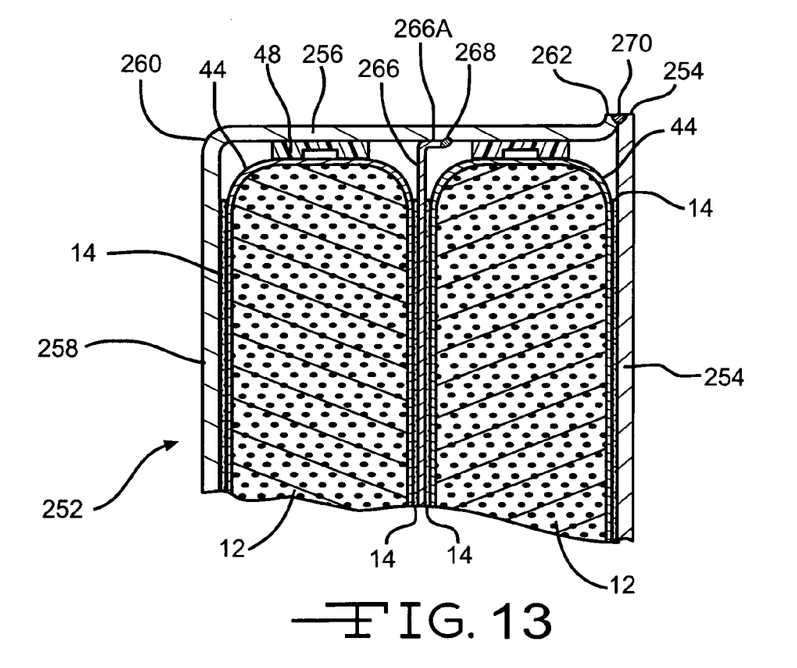
FIG. 13 is a cross-sectional view taken along line 13—13 of FIG. 12.
Figure 14:
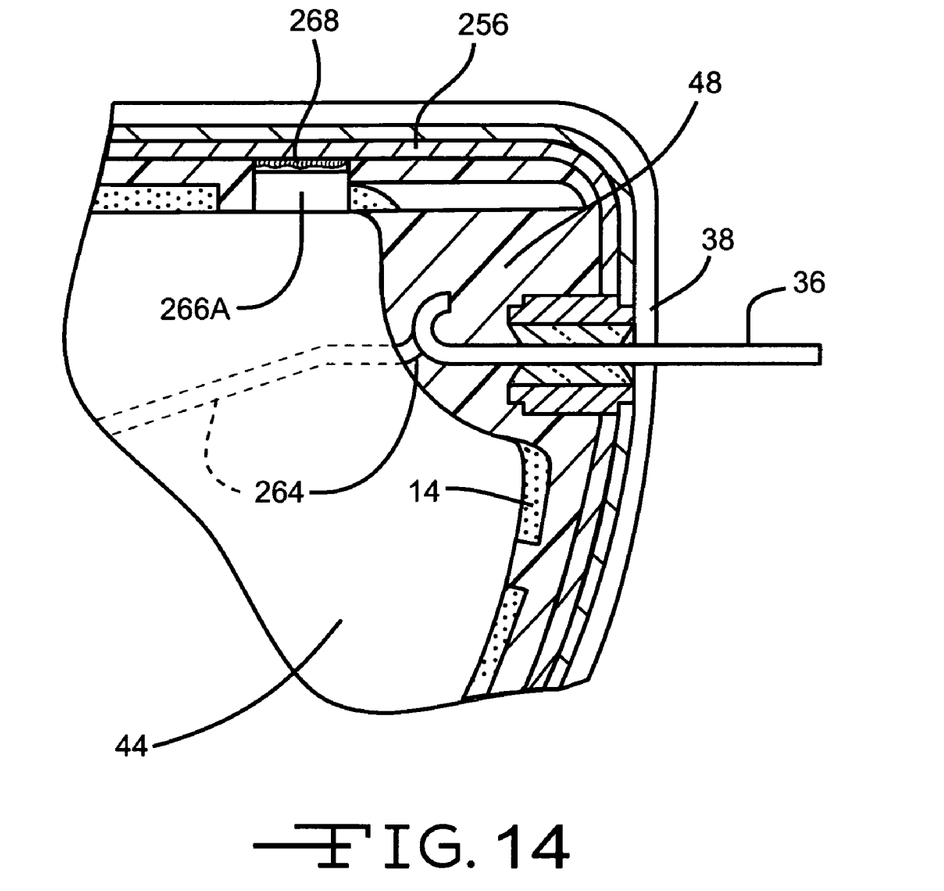
FIG. 14 is an enlarged view of a portion of the capacitor 250 shown in FIG. 12.

FIGS. 12 to 14 illustrate a further embodiment of a capacitor 250 according to the present invention. Capacitor 250 comprises a metallic enclosure of a first drawn portion 252 and a second stamped cover 254 housing two anodes in a side-by-side relationship. Casing portion 252 has a surrounding sidewall 256 extending to a face wall 258 at a curved intermediate bend 260. Opposite the bend 260, sidewall 256 forms into an outwardly extending rim having a planar edge 262. The casing cover 254 is a planar member having a peripheral edge 254A that is precisely aligned with edge 264 when the casing portions 252, 254 are contacted to each other.

Capacitor 250 is built by first contacting a cathode active material 14 to the inner surface of sidewall 258. An anode 12 enveloped by a separator 44 is nested in the casing portion and retained in position by the polymeric cradle 48. As previously described, an extending portion of an embedded anode wire (designed by the phantom lines 264 in FIGS. 12 and 14) is welded to an anode lead 36 electrically insulated from the enclosure by a glass-to-metal seal 38 prior to the cradle 48 being provided in a retaining relationship with the separator enveloped anode 12.

A relatively thin metallic foil or plate 266, preferably of the same material as the casing, has cathode active material 14 provided on both of its major sides. This plate 266 has a shape similar to that of the anode 12 except for an extending tab 266A bent into a right angle shape. Tab 266A is secured to the casing sidewall 256 by a tack weld 268 with one portion of its cathode active material 14 contacting the separator 44 of a first, inner one of the anodes 12. The second, outer anode 12 is then nested in the casing portion 252 and retained therein by a polymeric cradle 48. The separator 44 enveloping the second anode 12 rests on the cathode material 14 on the opposite side of plate 266.

As with the first, inner anode 12, the second, outer anode 12 also has an embedded anode wire with an extending portion (not shown) weld contacted to an anode lead (not shown) electrically insulated from the casing by a glass-to-metal seal (not shown). The casing cover 254 is then rested on the extending rim of the surrounding sidewall 256 with the edges 262, 254A of the respective casing portions 252, 254 in coplanar adjustment. A laser (not shown) then provides a weld 270 that hermetically seals the enclosure without damaging the internal capacitor components.

While a polymeric cradle has been shown in the various embodiments, that is not necessary. The cradle is preferred if it is anticipated that the capacitor will be subjected to shock and vibration forces sufficient to cause the anode to move inside the enclosure. If such rough treatment is not expected, the cradle can be dispensed with, which means there is additional internal volume for anode and cathode active components.

Furthermore, while the present invention has been decribed with respect to a capacitor, that should not be viewed as limiting its scope. Those skilled in the art after having read the present description will readily understand that the various enclosure structures are equally applicable for use with an electrochemical cell. In that case, the cathode is typically disposed in an intermediate position between anode active material in electrical contact with the inner surfaces of the face wall 24 and the inner surface 20A of the casing cover 20. For example, in a lithium/silver vanadium oxide cell, lithium is in electrical contact with the face wall 24 and cover 20 while silver vanadium oxide is disposed in an intermediate position, segregated from the lithium anode by a separator material. This is a typical case-negative cell design, as shown in U.S. Pat. No. 5,250,373 to Muffoletto et al., which is assigned to the assignee of the present invention and incorporated herein by reference. In a case positive design, silver vanadium oxide is in electrical contact with the face wall 24 and cover 20 and lithium is in the center position. A commonly used electrolyte for a Li/SVO cell is 0.8 to 1.2 molar $LiPF_6$ or $LiAsF_6$ in propylene carbonate/dimethoxyethane. A lithium ion cell is also contemplated. Such secondary cells are built with a carbonaceous anode and a lithiated cathode active material, such as $LiCoO_2$.

Thus, various embodiments of electrical energy storage devices have been described. Each includes at least one major sidewall comprising a cover having a relatively flat or planar plate-shaped profile. This makes them particularly well suited for seating against a planar support, such as against a sidewall of an implantable medical device, for example, a cardiac defibrillator, cardiac pacemaker, neurostimulator or a drug pump, among others. Additionally, two electrical energy storage devices can be built side-by-side with the planar cover being intermediate them. This helps with packaging efficiency, as the intermediate sidewall is common to both. Packaging efficiency is particularly important in an implantable medical device where "real estate" is at a premium.

It is appreciated that various modifications to the inventive concepts described herein may be apparent to those of ordinary skill in the art without departing from the spirit and scope of the present invention as defined by the appended claims.

What is claimed is:

1. An electrical energy storage device, which comprises:
   a) an enclosure comprising
      i) a first casing portion comprising a first face wall supporting a first surrounding sidewall;
      ii) a second casing portion comprising a planar, plate shaped cover outer surface spaced from a cover inner face wall by an intermediate cover peripheral edge oriented normal to the cover inner and outer face walls; and
      iii) wherein the first casing portion is securable to the cover with either the cover outer surface being coplanar with a first peripheral edge of the first surrounding sidewall or the intermediate cover peripheral edge being coplanar with a first outer surface of the first surrounding sidewall;
   b) a first active material in electrical contact with at least one of the first casing face wall and the cover inner face wall;
   c) a second active material of an opposite polarity as the first active material;
   d) a separator intermediate the first and second active materials;
   e) a glass-to-metal seal supported in at least one of the first and second casing portions to electrically insulate a lead for the second active material from the enclosure serving as a terminal for the first active material; and
   f) a working electrolyte provided in the enclosure in contact with the first and second active materials.

2. The electrical energy storage device of claim 1 as a capacitor having the first active material being a cathode active material and the second active material being an anode.

3. The electrical energy storage device of claim 1 wherein there are at least two second active material bodies positioned in the first casing portion with an intermediate conductive substrate electrically connected to the first surrounding sidewall and having first active material on each of its major sides.

4. The electrical energy storage device of claim 1 wherein the first active material is a cathode active material contacted to the first casing face wall and the cover inner wall by either a pad printing process or as an ultrasonically deposited spray.

5. The electrical energy storage device of claim 1 wherein a polymeric cradle supports between the first surrounding sidewall and an end wall intermediate the first and second face walls of a body of the second active material to prevent movement of the second active material body inside the enclosure during high shock and vibration conditions.

6. The electrical energy storage device of claim 1 wherein the cover is welded to the first casing portion to provide the enclosure.

7. The electrical energy storage device of claim 1 wherein the first active material is a cathode active material selected from the group consisting of ruthenium, cobalt, manganese, molybdenum, tungsten, tantalum, iron, niobium, iridium, titanium, zirconium, hafnium, rhodium, vanadium, osmium, palladium platinum, nickel, lead, gold, silver, cobalt, and mixtures thereof and the second active material is an anode selected from the group consisting of tantalum, aluminum, titanium, niobium, zirconium, hafnium, tungsten, molybdenum, vanadium, silicon, germanium, and mixtures thereof.

8. The electrical energy storage device of claim 1 as either a capacitor or an electrochemical cell.

9. An electrical energy storage device, which comprises:
   a) an enclosure comprising
      i) a first casing portion comprising a first face wall supporting a first surrounding sidewall;
      ii) a planar, plate shaped cover as a second casing portion comprising a cover outer surface spaced from a cover inner face wall by an intermediate cover peripheral edge oriented normal to the cover inner and outer face walls
      iii) wherein the first casing portion is securable to the cover with the intermediate cover peripheral edge being coplanar with a first outer surface of the first surrounding sidewall;
   b) a cathode active material in electrical contact with the first casing face wall and the cover inner face wall;
   c) an anode comprising first and second major anode face walls positioned adjacent to the cathode active material on the respective first and second casing face walls;
   d) a separator intermediate the anode and the cathode active material;
   e) a glass-to-metal seal supported in at least one of the first and second casing portions to electrically insulate an anode lead from the enclosure serving as a terminal for the cathode active material; and
   f) a working electrolyte provided in the enclosure in contact with the anode and cathode active material.

10. The electrical energy storage device of claim 9 wherein the first face wall of the first casing portion is oriented normal to the integral first surrounding side wall.

11. The electrical energy storage device of claim 9 wherein the cover comprises at least one protrusion deflecting into the enclosure from the cover outer surface and being spaced from the cover peripheral edge by a distance substantially equal to a thickness of the first surrounding sidewall of the first casing portion.

12. The electrical energy storage device of claim 11 wherein the protrusion is endless.

13. The electrical energy storage device of claim 9 including a third casing portion comprising a third face wall supporting a third surrounding sidewall having a third peripheral edge, wherein a second anode is positioned in the third casing portion prevented from contacting a cathode active material in electrical contact with the third face wall by an intermediate separator and wherein the third peripheral edge contacts the cover outer surface with the intermediate cover peripheral edge being coplanar with a third outer surface of the third surrounding sidewall, and an electrolyte provided in the second enclosure formed by the third casing portion closed by the cover.

14. The electrical energy storage device of claim 13 wherein the cathode active material is provided on the cover outer surface.

15. An electrical energy storage device, which comprises:
   a) an enclosure comprising
      i) a first casing portion comprising a first face wall supporting a first surrounding sidewall;
      ii) a planar, plate shaped cover as a second casing portion comprising a cover outer surface spaced from a cover inner face wall by an intermediate cover peripheral edge oriented normal to the cover inner and outer face walls; and iii) wherein the first casing portion is securable to the cover with either the cover outer surface being coplanar with a first peripheral edge of the first surrounding sidewall or the cover peripheral edge being coplanar with a first outer surface of the first surrounding sidewall;

b) a cathode active material in electrical contact with the first casing face wall and the cover inner face wall;

c) an anode comprising first and second major anode face walls positioned adjacent to the cathode active material on the respective first and second casing face walls;

d) a separator intermediate the anode and the cathode active material;

e) a glass-to-metal seal supported in at least one of the first and second casing portions to electrically insulate an anode lead from the enclosure serving as a terminal for the cathode active material; and f) a working electrolyte provided in the enclosure in contact with the anode and cathode active material.

16. The electrical energy storage device of claim 15 wherein the first surrounding sidewall comprises an annular rim of a depth to receive the cover with the cover outer surface being coplanar with the first peripheral edge of the first surrounding sidewall.

* * * * *